Aug. 9, 1932.  M. HESPELER  1,870,510

DEVICE FOR CARRYING POWER LINES

Filed April 10, 1930

Inventor:
Max Hespeler,
by Foster + Codier
his attorneys.

Patented Aug. 9, 1932

1,870,510

UNITED STATES PATENT OFFICE

MAX HESPELER, OF NECKARSULM, GERMANY

DEVICE FOR CARRYING POWER LINES

Application filed April 10, 1930, Serial No. 443,238, and in Germany May 23, 1929.

The present invention relates to the carrying of power lines, such as electric cables, compressed air pipes or the like, to portable machines or appliances, for example those which, for example, are adapted to be transported easily in the open from one point of operation to another. By means of the present invention the disadvantages of the previous methods of supplying power to portable machines of all kinds are adapted to be eliminated. The disadvantages mainly resided therein that the cable or the like was always located on the ground so that care was always required not only at the point of operation but in other places so as not to damage the cable or the like. Power lines of this character were subjected to comparatively considerable wear in the course of time in spite of strong construction as they were mostly drawn along the ground when used in connection with a machine which was moved from one place of operation to another. The carrying of the line from one point of operation to the other is also very inconvenient and tedious.

According to the present invention these disadvantages are eliminated in the following manner: Between two masts or two other points fixed at a high level there is provided a cable, for example a wire cable extending over the operating range of the machine, and from which carriers for the power line are suspended by means of rollers. The number of carriers depends upon the length of the supply line from its fixed point of connection, which is preferably located on a mast or other point of securing the wire cable, to its point of connection to the apparatus to be supplied.

In these cases it is of advantage to so arrange the spacing between the carriers that the line is suspended free from disturbance and without causing an obstruction at the point of operation, even when adjacent carriers are located close to one another. The connecting line is also adapted not to sag too much when the ends thereof are extended. In order that the line does not form too sharp an angle at the point at which it rests on the holder, and to which it is preferably secured, the carriers are preferably curved at the top. The free end of the line between the last carrier and the apparatus to be supplied is preferably of such a length that it does not touch the ground during operation but in spite of this permits a great freedom of movement of the machine or the like.

In the accompanying drawing is illustrated one example of numerous possibilities of carrying the invention into effect as applied to an appliance of any suitable type for use in the open.

Figure 1:
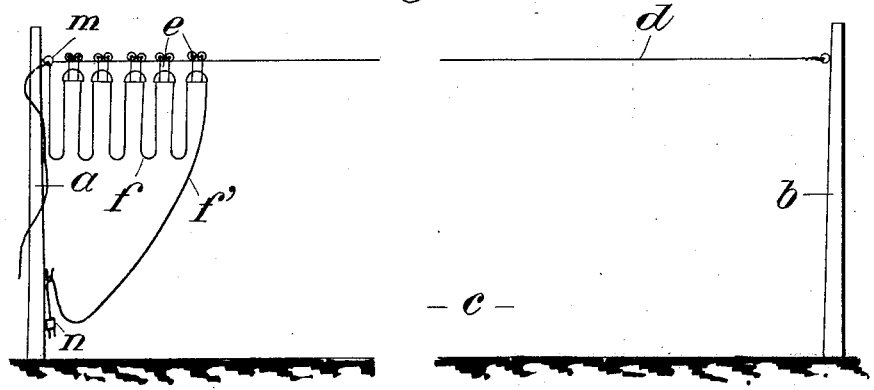
Figure 2:
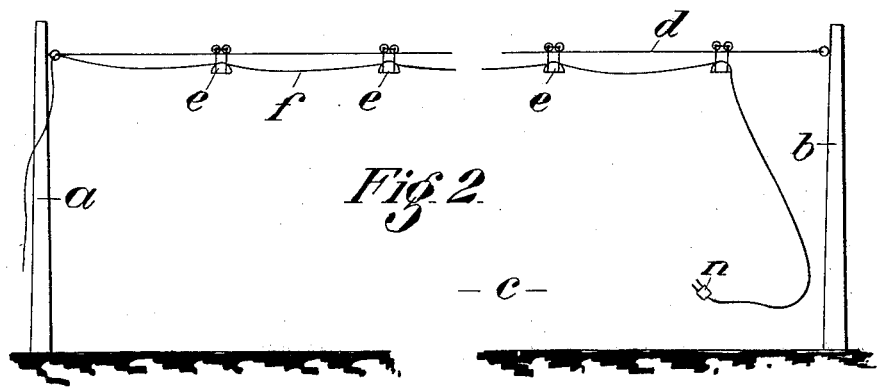
Figure 3:
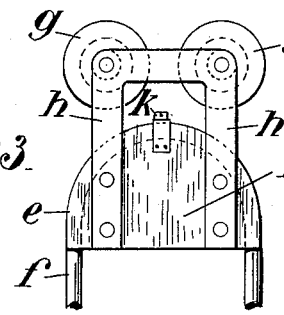
Figure 4:
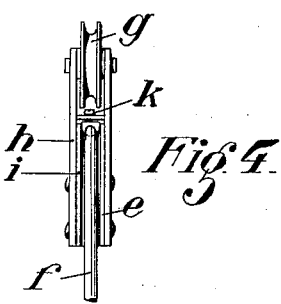

Figures 1 and 2 show the system when the apparatus is not in use and when the line has been extended to the full extent, and Figures 3 and 4 show a carrier for the line in side and end elevation.

Between the two masts $a$ and $b$ there is extended at a suitable height above the field of operation $c$ a rope $d$, preferably a wire rope, which serves for supporting the supply line by means of a series of carriers $e$ to which the power supply line $f$, for example an electric supply cable or a compressed air pipe, is secured at suitable intervals.

The number of carriers $e$ depends upon the height of the supporting rope above the field of operation $c$, the length and the weight of the power line $f$ and the like. The number of carriers and their spacing are also so selected that the line hangs downwardly free from disturbance between them when the various carriers are located adjacent to one another.

The carrier $e$ is preferably provided with two rollers $g$ running on the supporting rope $d$. From these rollers there is suspended, for example by means of links $h$ a preferably semi-circular carrying member $i$ for the line $f$ which may be secured to the carrier $i$ at $k$.

The connection of the power line to the supply cable or pipe is preferably located at $m$ on one of the masts $a$, to which may be also attached the free end $f'$ leading to the operating appliance when not in use, this free end being provided in the known manner with a suitable connection $n$ such as a plug or a screw member.

As long as the operating appliance is not in use the carriers $e$ are arranged close together as shown in Figure 1 at that end of the supporting rope $d$ at which the connection

*m* is provided. The portions *f* between the carriers hang freely downwards, but in such a manner that in this condition they do not cause any disturbance and are not liable to be damaged. When the operating appliance is to be used the separate carriers *e* move along the supporting rope *d* according to the distance away of the point of operation, so that the connection of the point of connection *m* for the supply of power and the operating appliance can always be effected efficiently without the line causing any disturbance over the field of operation or being liable to damage by carelessness.

If the length of the downwardly hanging end *f'* of the line is insufficient for any particular range of operation an intermediate line may be temporarily connected up at *n*.

I claim:—

In a device of the kind described having a supporting cable and an electric conductor, means for supporting the conductor wire including a pair of laterally spaced inverted U-shaped frames of general rectangular shape, a block in the form of a semi-circular segment having its chordal side horizontal and its arcuate side extending upwards, said block being fixed between the lower parts of the legs of said frames and having its arcuate side grooved to receive the conductor, pulley axles extending between said frames at the upper parts of the legs, and pulleys on said axles peripherally grooved to fit on the cable.

In testimony whereof I affix my signature.

MAX HESPELER.